H. NORTON.
Plow.

No. 13,653.  Patented Oct. 9, 1855.

UNITED STATES PATENT OFFICE.

HARRISON NORTON, OF FARMINGTON, MAINE.

IMPROVEMENT IN PLOWS.

Specification forming part of Letters Patent No. 13,653, dated October 9, 1855.

*To all whom it may concern:*

Be it known that I, HARRISON NORTON, of Farmington, in the county of Franklin and State of Maine, have invented a new and useful Improvement in Plows; and I do hereby declare that the following is a full, clear, and exact description of the same, reference being had to the annexed drawings, making a part of this specification, in which—

Figure 1:
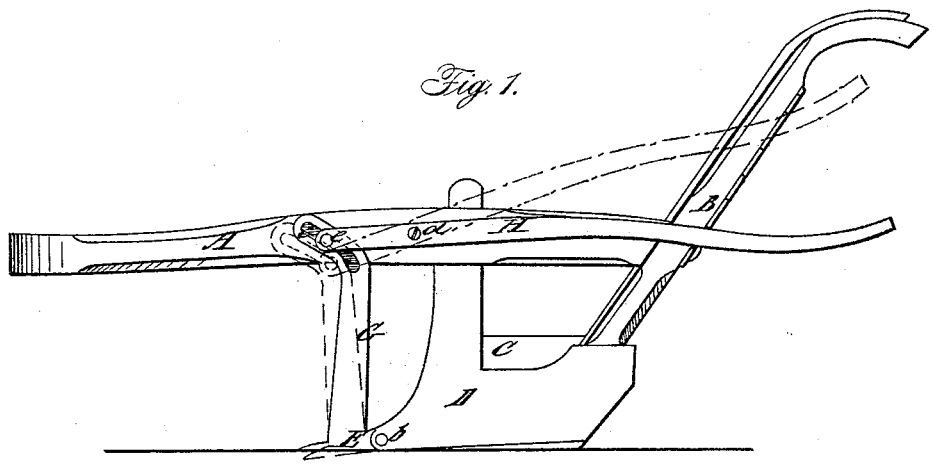
Figure 2:
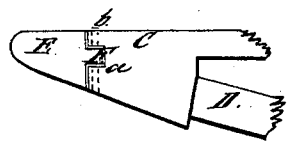

Figure 1 is a side view of my improvement. Fig. 2 is an under view of the share.

Similar letters of reference indicate corresponding parts in the two figures.

The nature of my invention consists in having the share of the plow connected by a hinge to the mold-board and landside, and having the share connected to a lever, or arranged in any proper way, so that the point of said share may be elevated or depressed as desired, and the point of the share have a greater or less tendency to enter the earth, and thereby cause furrows to be formed of the desired depth.

To enable others skilled in the art to fully understand and construct my invention, I will proceed to describe it.

A represents the beam of the plow. B B are the handles, C is the mold-board, and D the landside.

E is the share, the back end of which has a tongue or projection, F, formed on it, which tongue or projection fits in a recess, a, in the front end of the mold-board, (see Fig. 2,) and a pin, b, passes through the end of the mold-board and tongue or projection F. The share E is rather shorter than those of ordinary make, and the front ends of the mold-board and landside are brought rather more forward and are curved nearly the same as the back parts of the ordinary shares.

G is a vertical bar, the lower end of which is connected to the side of the share E. The upper end of this bar is bent obliquely outward, as shown in Fig. 1, and this bent portion has a slot, c, made through it. (See Fig. 1.)

H is a lever attached to one side of the beam A by a pivot, d. The inner end of this lever has a pin, e, attached to it, said pin fitting in the slot c in the upper end of the bar G. By raising and depressing the outer end of the lever H the point of the share E will be raised or lowered, and consequently the share may be made to have a greater or less tendency to enter the earth, and a furrow of the desired depth may be made. The outer end of the lever H is secured at any proper point by a rack, I, attached to the side of one of the handles B, the lever being fitted in either of the notches in the rack.

By the above improvement it will be seen that the point of the share E may be elevated and depressed at any time by the plowman by merely moving the end of the lever H, and in cases where the point of the share passes over hard earth and is liable to be thrown upward or out of the earth, the tendency may be immediately counteracted by moving the lever H and depressing the point of the share, the share being capable of adjustment as the plow is moved along.

Having thus described my invention, what I claim as new, and desire to secure by Letters Patent, is—

Attaching the share E to the mold-board C and landside D of the plow by a hinge or joint, and moving said share by means of the bar G and lever H, or their equivalents, substantially as shown and described.

HARRISON NORTON.

Witnesses:
 EBENEZER NORTON,
 G. W. WHITNEY.